US008406828B2

(12) United States Patent  (10) Patent No.: US 8,406,828 B2
Na et al.  (45) Date of Patent: Mar. 26, 2013

(54) MOBILE TERMINAL (75) Inventors: Youngsoo Na, Seoul (KR); Dongkyu Seo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 47 days.

(21) Appl. No.: 12/819,642

(22) Filed: Jun. 21, 2010

(65)  Prior Publication Data

US 2011/0003623 A1  Jan. 6, 2011

(30)  Foreign Application Priority Data

Jul. 6, 2009 (KR) ........................ 10-2009-0061316

(51) Int. Cl.
*H04M 1/00* (2006.01)
(52) U.S. Cl. ................. 455/575.1; 455/90.3; 455/562.1; 343/700
(58) Field of Classification Search ............... 455/73, 455/90.1, 90.2, 90.3, 117, 562.1, 575.1, 575.4, 455/575.7; 343/700, 702, 767
See application file for complete search history.

(56)  References Cited

U.S. PATENT DOCUMENTS

| 7,151,955 | B2 * | 12/2006 | Huber et al. ............... 455/575.5 |
| 7,482,982 | B2 * | 1/2009 | Jenwatanavet et al. ....... 343/702 |
| 2007/0238492 | A1 | 10/2007 | Kaneko et al. |
| 2008/0167073 | A1 * | 7/2008 | Hobson et al. ............... 455/557 |
| 2009/0029741 | A1 * | 1/2009 | Satou et al. ................... 455/566 |
| 2010/0103054 | A1 * | 4/2010 | Shi et al. ....................... 343/702 |
| 2010/0123632 | A1 * | 5/2010 | Hill et al. ...................... 343/702 |

FOREIGN PATENT DOCUMENTS

| CN | 1190805 A | 8/1998 |
| CN | 1708915 A | 12/2005 |
| CN | 1870448 A | 11/2006 |
| CN | 2912132 Y | 6/2007 |
| CN | 101118984 A | 2/2008 |
| CN | 201243278 Y | 5/2009 |
| EP | 1 643 655 A1 | 4/2006 |
| KR | 10-2009-0027514 A | 3/2009 |

* cited by examiner

*Primary Examiner* — Andrew Wendell
*Assistant Examiner* — Chung-Tien Yang
(74) *Attorney, Agent, or Firm* — Birch, Stewart, Kolasch & Birch, LLP (57)  ABSTRACT

Disclosed is a mobile terminal including a terminal main body formed with an accommodation chamber for accommodating a battery, a cover combined with the main body to cover the accommodation chamber and formed with a conductive material to transmit and receive radio electromagnetic waves, a circuit board formed with an electrical ground to process a signal corresponding to the radio electromagnetic waves, a feed connection portion electrically connecting the circuit board with the cover to allow the circuit board to feed power to the cover, and a ground connection portion electrically connecting the cover with the electrical ground to make a ground to the cover.

15 Claims, 8 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2009-0061316, filed on Jul. 6, 2009, the contents of which is incorporated by reference herein in its entirety.

BACKGROUND OF THE INVENTION

1. Field of the Invention

The present invention relates to a mobile terminal having an antenna transmitting and receiving radio electromagnetic waves.

2. Description of the Related Art

Terminals may be divided into a mobile/portable terminal and a stationary terminal according to their mobility. The mobile terminal may then be divided into a handheld terminal and a vehicle mounted terminal according to whether it can be directly carried by a user.

As the functions becomes diversified, the terminal is implemented in the form of a multimedia player having complicated functions such as capturing still or moving images, playing music or video files, receiving broadcast signals, and the like.

In order to implement such complicated functions of a multimedia player, various new attempts have been applied in the aspect of the hardware or software. As an example, a user interface environment is provided to allow the user to easily and conveniently retrieve or select the functions.

Furthermore, as being considered as a personal belonging for expressing his or her own personality, various design forms are required for the mobile terminal. Such design forms may include structural modifications and improvements for allowing the user to more conveniently use a mobile terminal.

As one of the structural modifications and improvements, an antenna may be taken into consideration.

SUMMARY OF THE INVENTION

An object of the present invention is to provide a mobile terminal having an antenna implemented in a different manner from the prior art.

Furthermore, another object of the present invention is to provide a low-profile mobile terminal and an antenna implementing the same.

In order to accomplish the foregoing objectives, a mobile terminal according to an embodiment of the present invention may include a terminal main body formed with an accommodation chamber for accommodating a battery, a cover combined with the main body to cover the accommodation chamber and formed with a conductive material to transmit and receive radio electromagnetic waves, a circuit board formed with an electrical ground to process a signal corresponding to the radio electromagnetic waves, a feed connection portion electrically connecting the circuit board with the cover to allow the circuit board to feed power to the cover, and a ground connection portion electrically connecting the cover with the electrical ground to make a ground to the cover. The mobile terminal may include an antenna built in the main body to transmit and receive radio electromagnetic waves having a frequency bandwidth different from the radio electromagnetic waves.

According to an aspect of the present invention, the feed connection portion may include a feed terminal and a first contact region. The feed terminal is mounted on the circuit board and formed to elastically press the cover. The first contact region is formed on a surface of the cover to make contact with the feed terminal. A surface of the cover may be covered by a coating layer for protecting the cover, and the first contact region may be connected with the outside by penetrating the coating layer.

According to another aspect of the present invention, the ground connection portion may include a ground terminal and a second contact region. The ground terminal is mounted on the circuit board and electrically connected to the electrical ground and formed to elastically press the cover. The second contact region is formed on a surface of the cover to make contact with the ground terminal. A surface of the cover may be covered by a coating layer for protecting the cover, and the second contact region may be connected with the outside by penetrating the coating layer.

According to still another aspect of the present invention, the feed connection portion and the ground connection portion may be formed to be adjacent to either one of both ends of the cover in a length direction. A path connected from the feed connection portion to the ground connection portion by passing through the one end thereof may be formed with a half-wave length with respect to the frequency of the radio electromagnetic waves. The feed connection portion and the ground connection portion may be separated with the same distance from the one end, respectively. A surface exposed to the outside of the cover may form a same plane as a surface of the main body to cover an end of the cover.

According to still another aspect of the present invention, the mobile terminal may include an inductor electrically connected to the feed connection portion at a position adjacent to the feed connection portion. The inductor may be mounted on the circuit board, and a signal transceiver for transmitting and receiving a signal corresponding to the radio electromagnetic waves may be disposed on the circuit board, and the feed connection portion, inductor and signal transceiver may be connected in series with one another.

According to still another aspect of the present invention, the ground connection portion may be disposed in a plural number at positions separated from each other. The ground connection portion may include a first and a second ground connection portion disposed in a plural number at positions separated from each other. The first and the second ground connection portions may be disposed to be adjacent to either one of both ends of the cover in a length direction, respectively. The feed connection portion may be formed to be separated from the second ground connection portion in a direction crossed with a direction heading from the first ground connection portion toward the second ground connection portion.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a mobile terminal associated with the present invention will be described in more detail with reference to the accompanying drawings. For the same elements and equivalents to those shown in the figures and in the description, the same or like reference numerals are used and a corresponding detailed explanation is omitted merely for the sake of convenience. As used herein, the singular forms are intended to include the plural forms as well, unless the context clearly indicates otherwise.

Mobile terminals described in the present invention may include mobile phones, smart phones, laptop computers, digital broadcasting terminals, personal digital assistants (PDAs), portable multimedia players (PMPs), navigators, and the to like.

Figure 1:
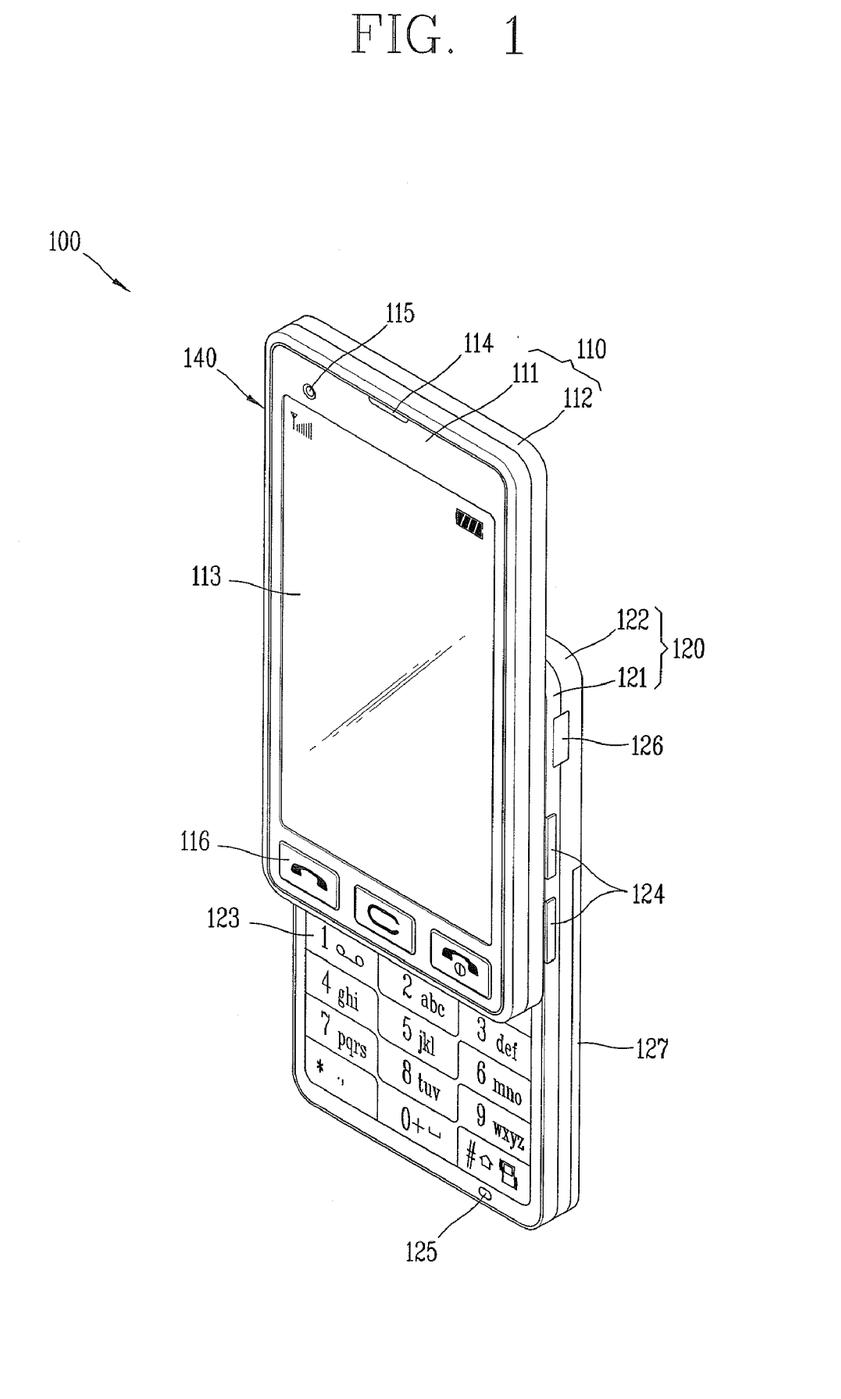
FIG. 1 is a perspective view illustrating a mobile terminal according to an embodiment of the present invention.

FIG. 1 is a perspective view illustrating a mobile terminal according to an embodiment of the present invention.

A main body (hereinafter, referred to as 'body') of a mobile terminal 100 may include a first body 110 and a second body 120 slidably moved along at least one direction on the first body 110. Here, the present invention will not be limited to the configuration, but may be also applicable to various types of mobile terminals, such as bar type, folder type, swing type, swivel type and the like.

The state in which the first body 110 is positioned over the second body 120 may be referred to as a closed configuration, and the state in which the first body 110 exposes at least part of the second body 120, as shown in the drawing, may be referred to as an open configuration.

In addition, the mobile terminal may be mainly operable in a standby (idle) mode when in the closed configuration, but this mode may be released by the user's manipulation. Also, the mobile terminal may be mainly operable in a phone call mode in the open configuration, but this mode may also be changed into the idle mode according to the user's manipulation or after passing a certain period of time.

A case (housing, casing, cover, etc.) forming the outside of the first body 110 is formed by a front case 111 and a rear case 112. In addition, various electronic components may be disposed in a space between the front case 111 and the rear case 112. At least one intermediate case may additionally be disposed between the front case 111 and the rear case 112. Further, the cases can be formed of resin in a manner of injection molding, or formed using metallic materials such as stainless steel (STS) and titanium (Ti).

A display 113, an audio output unit 114, a first video input unit 115 or a first manipulation unit 116 may be disposed on the first body 110, particularly, on the front case 111.

The display 113 may be configured to display visible information, examples of which include a liquid crystal display (LCD) module, an organic light emitting diodes (OLED) module, a transparent OLED (TOLED) and the like.

The display 113 may further include a touch sensor so as to allow a user to perform a touch input. The display 113 may be configured to generate various tactile effects which a user can feel upon a touch input. Such function can be implemented by employing a haptic module cooperating with the display 113. The haptic module can generate tactile effects, representatively, a vibration. Such haptic module may be disposed in various ways depending on the configuration of the mobile terminal 100 as well as the configuration of the display 113.

The audio output unit 114 may be configured as a receiver or a speaker.

The first video input unit 115 may be a camera module for allowing a user to capture images or video.

The first manipulation unit 116 may receive a command input to control the operation of the mobile terminal 100. The first manipulation unit 116 may be formed as a touch screen together with the display 113.

Similar to the first body 110, a front case 121 and a rear case 122 may configure a case of the second body 120.

A second manipulation unit 123 may be disposed at the second body 120, more particularly, at a front face of the front case 121.

A third manipulation unit 124, a first audio input unit 125 and an interface 126 may be disposed on at least one of the front case 121 and the rear case 122.

The first to third manipulation units 116, 123 and 124 can be commonly referred to as a manipulation portion, which can be manipulated in any tactile manner that user can make a touch input.

For example, the manipulation portion can be implemented as a dome switch or touchpad which can receive information or commands input by a user in a pushing or touching manner, or implemented in a manner of using a wheel, a jog or a joystick to rotate keys.

From a functional viewpoint, the first manipulation unit 116 can be used for inputting commands such as START, END, SCROLL or the like, and the second manipulation unit 123 can be used for inputting numbers, characters, symbols, or the like. Also, the third manipulation unit 124 can function as a hot key for activating a specific function, such as activation of the first video input unit 115.

The first audio input unit 125 may be configured as a microphone so as to receive user's voice, other sounds and the like.

The interface 126 may interface the mobile terminal 100 and external devices so as to allow data exchange therebetween or the like. For example, the interface 126 may be at least one of a wired/wireless access terminal for earphones, a short-range communication port (e.g., IrDA port, Bluetooth port, wireless LAN port, and the like), and power supply terminals for supplying power to the mobile terminal.

The interface 126 may be a card socket for accommodating an external card such as Subscriber Identification Module (SIM), User Identity Module (UIM), memory card for storing information, or the like.

Figure 2:
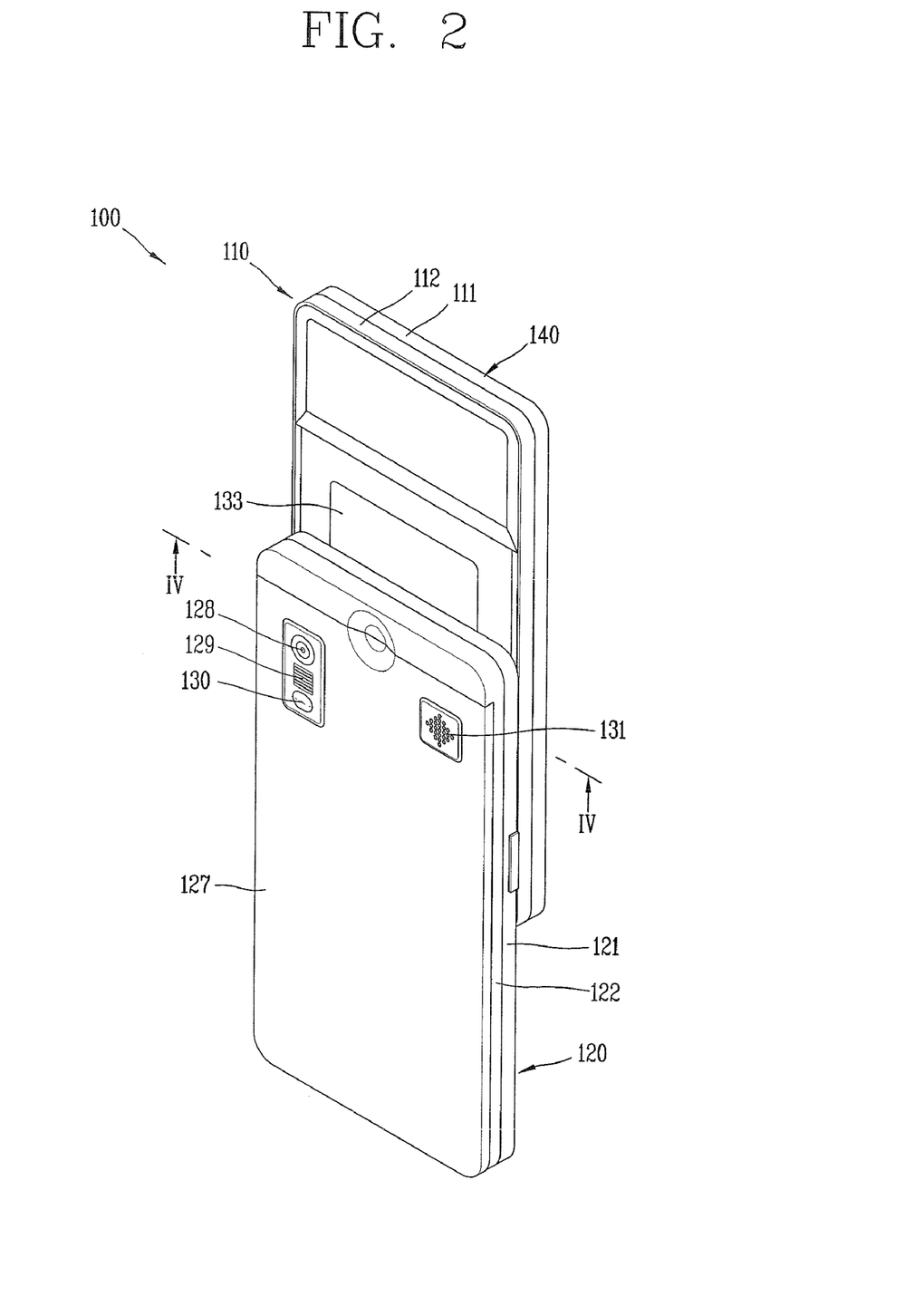
FIG. 2 is a rear perspective view illustrating a mobile terminal of FIG. 1.

FIG. 2 is a rear perspective view illustrating a mobile terminal of FIG. 1.

Referring to FIG. 2, a second video input unit 128 may be additionally mounted on the rear case 122 of the second body 120. The second video input unit 128 faces a direction which is substantially opposite to a direction faced by the first video input unit 115 (see FIG. 1). Also, the second video input unit 128 may be a camera having a different number of pixels from that of the first video input unit 115.

For example, the first video input unit 115 may operate with a relatively lower number of pixels (lower resolution). Thus, the first video input unit 115 may be useful when a user can capture his face and send it to another party during a video call or the like. On the other hand, the second video input unit 128 may operate with a relatively higher number of pixels (higher resolution) such that it can be useful for a user to obtain higher quality pictures for later use.

A flash 129 and a mirror 130 may be additionally disposed adjacent to the second video input unit 128. The flash 129 operates in conjunction with the second video input unit 128 when taking a picture using the second video input unit 128. The mirror 130 can cooperate with the second video input unit 128 to allow a user to photograph the user himself or herself in a self-portrait mode.

As described above, it has been described that the second video input unit 128 is disposed at the second body 120; however, the present invention may not be limited to the configuration. It is also possible that one or more of those components, which have been described to be implemented on the rear case 122, such as the second video input unit 128, will be implemented on the first body 110, particularly, on the rear case 112. In this configuration, the component(s) disposed on the rear case 112 can be protected by the second body 120 in a closed configuration of the mobile terminal. In addition, without the second video input unit 128, the first video input unit 115 can be implemented to be rotatable so as to rotate up to a direction which the second video input unit 128 faces.

A second audio output unit 131 may be additionally disposed at the rear case 122.

The second audio output unit 131 can cooperate with the first audio output unit 114 (see FIG. 1) to provide stereo output. Also, the second audio output unit 131 may be configured to operate as a speakerphone.

An antenna for Bluetooth communication, GPS communication or the like may be disposed at a terminal body. At the rear case 122 may be disposed a broadcast signal receiving antenna (not shown), as well as an antenna for call communications or the like. The antenna 132 may be provided in a retractable manner on the terminal body 110.

A part of a slide module 133 for slidably coupling the first body 110 to the second body 120 may be disposed at the rear case 112 of the first body 110. Another part of the slide module 133 may be disposed at the front case 121 of the second body 120, so as not to be exposed to the exterior as shown in the drawing.

A power supply 127 for supplying power to at least one component of the portable terminal 100 may be disposed at the rear case 122. The power supply 127 may include a rechargeable battery 135 (see FIG. 3) to supply power, for example. The battery 135 may be detachably coupled thereto for charging or the like.

Figure 3:
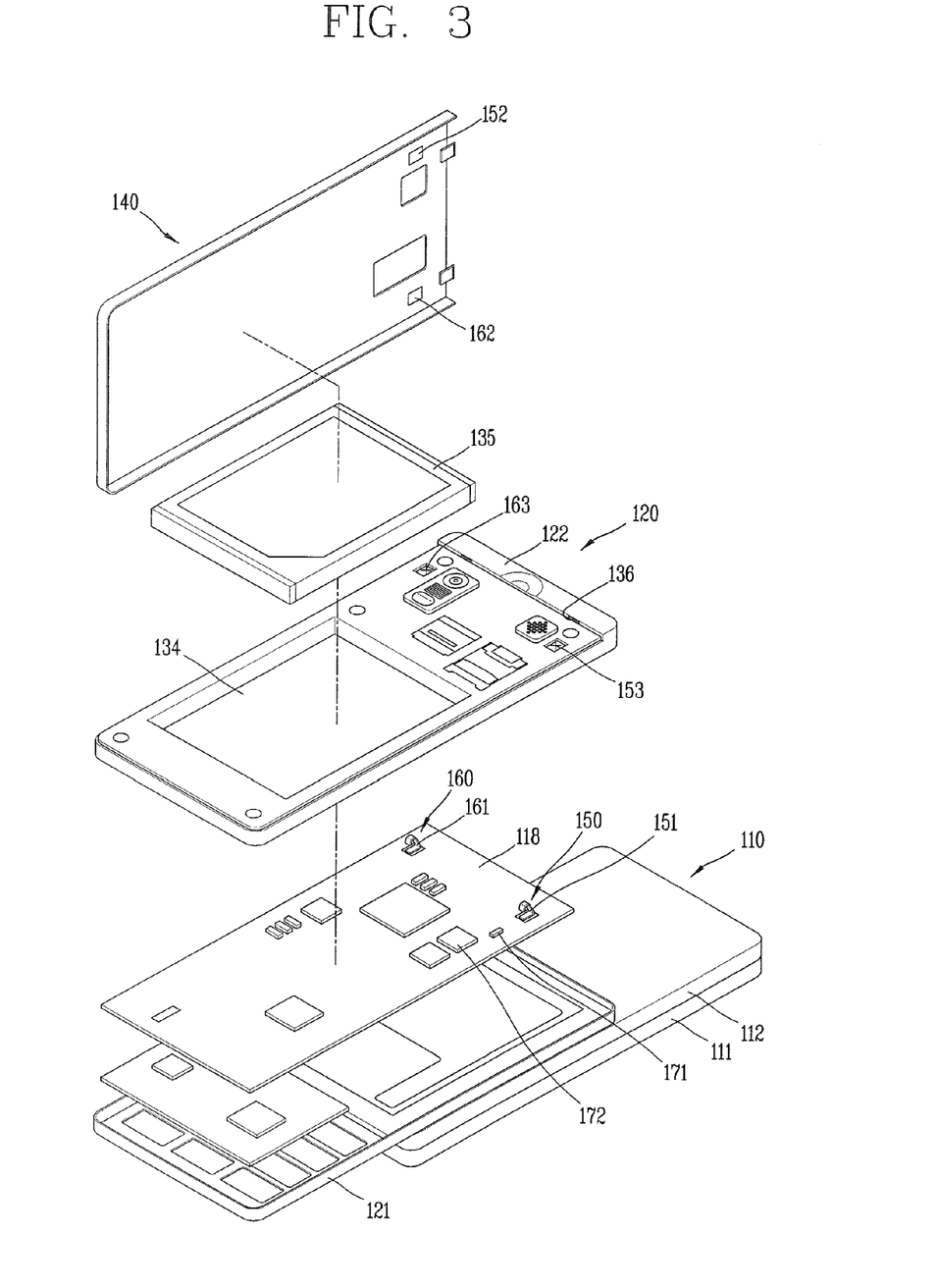
FIG. 3 is an exploded view illustrating a second body of FIG. 2 as seen from the rear side thereof.
Figure 4:
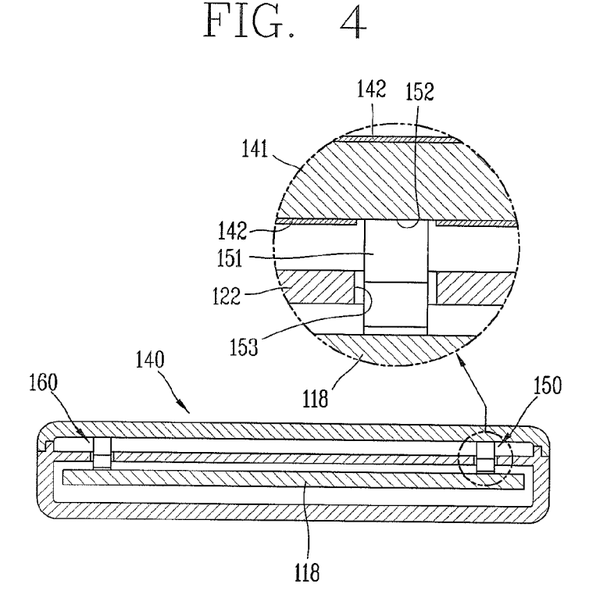
FIG. 4 is a cross-sectional view illustrating a second body taken along the line IV-IV of FIG. 2.
Figure 5:
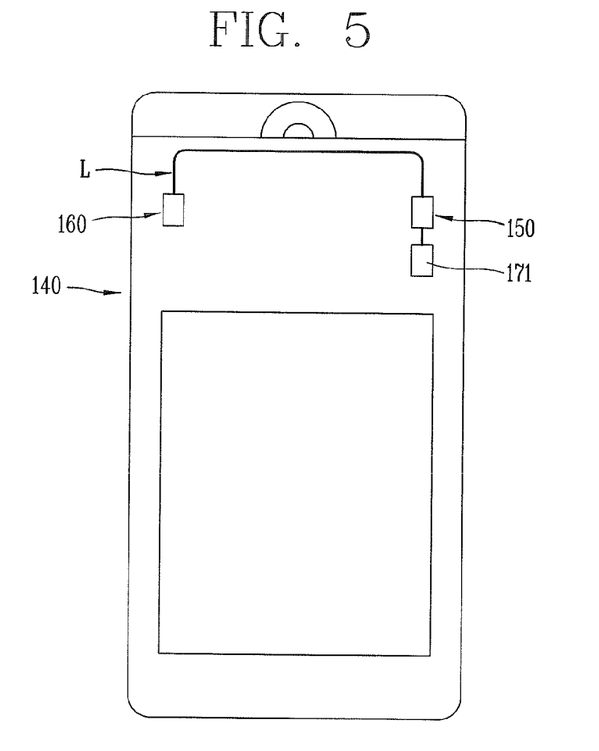
FIG. 5 is a conceptual view illustrating the concept of a loop antenna formed according to the present invention.

FIG. 3 is an exploded view illustrating a second body 120 of FIG. 2 as seen from the rear side thereof, and FIG. 4 is a cross-sectional view illustrating a second body 120 taken along the line IV-IV of FIG. 2, and FIG. 5 is a conceptual view illustrating the concept of a loop antenna (L) formed according to the present to invention.

Referring to the drawings, a recess-shaped accommodation chamber 134 is formed at a rear case 122. The accommodation chamber 134 is formed in a size corresponding to the outside of the battery 135 to mount the battery 135. The accommodation chamber 134 may be provided with a connection terminal 136 to be connected with the battery 135.

The accommodation chamber 134 and the battery 135 constitute a power supply unit 127.

As illustrated in the drawing, a cover 140 for opening or closing the accommodation chamber 134 is mounted at a second body 120, particularly, a rear case 122. The cover 140 may be formed in a plate shape to cover the accommodation chamber 134 and battery 135. A locking device 136 for locking the cover 140 in the second body 120 may be provided on at least one of the cover 140 and the rear case 122.

The cover 140 may be formed with a conductive material to transmit and receive radio electromagnetic waves. The conductive material may be a metal material such as aluminum, and the like, for example. A coating layer 142 for protecting a body 141 of the metal material may be formed on at least one surface of the cover 140. The coating layer 142 is made of a transparent synthetic resin and may be formed at both surfaces of the cover 140.

A circuit board 118 may be mounted at a front case 121 of the second body 120. Alternatively, the circuit board 118 may be mounted at a surface opposite to a surface formed with the accommodation chamber 134. The circuit board 118 may be configured as an example of a controller 180 (see FIG. 9) for controlling the mobile terminal to perform various functions thereof. The circuit board 118 may be formed to process a signal corresponding to radio electromagnetic waves transmitted and received by the cover.

The circuit board 118 is formed with a plurality of layers, and at least one of the plurality of layers may be an electrical ground or earth. The electrical ground may be formed such that a thin film with a conductive material is coated on a layer of the circuit board 118 to cover a main surface of the circuit board 118.

Referring to the drawings, a feed connection portion 150 and a ground connection portion 160 are formed on the cover 140 and the circuit board 118.

The feed connection portion 150 electrically connects the circuit board 118 with the cover 140 to allow the circuit board 118 to feed power to the cover 140. The feed connection portion 150 may include a feed terminal 151 and a first contact region 152.

The feed terminal 151 is mounted on the circuit board 118, and formed to elastically press the cover 140. The feed terminal 151 is protruded from the circuit board 118, and formed to make contact with the cover 140 by passing through a through-hole 153 formed on the rear case 122.

The first contact region 152 is formed on a surface of the cover 140, and also formed to make contact with the feed terminal 151. The first contact region 152 is connected with the outside by passing through the coating layer 142, and made directly contact with the feed terminal 151 through the opening.

The ground connection portion 160 electrically connects the cover 140 with an electrical ground formed on the circuit board 118 to make a ground to the cover 140. Nevertheless, the present invention is not necessarily limited to this, but the electrical ground may be formed with a separate component, for example, a supporting member having a conductive material, to be mounted within a mobile terminal. Here, the supporting member denotes a member formed to support an electronic component built in a mobile terminal, and it may be electrically connected with the circuit board 118 to extend an electrical ground.

The ground connection portion 160 may include a ground terminal 161 and a second contact region 162.

The ground terminal 161 is mounted on the circuit board 118 to be electrically connected to an electrical ground and formed to elastically press the cover 140. The ground terminal 161 is protruded from the circuit board 118, and formed to make contact with the cover 140 by passing through a through-hole 163 formed on the rear case 122.

The second contact region 162 is formed on a surface of the cover 140, and also formed to make contact with the ground terminal 161. A through-hole is provided on the coating layer 142 formed on a surface of the cover, and the second contact region 162 is connected with the outside via the through-hole. The second contact region 162 is made directly contact with the ground terminal 161 inserted in the through-hole.

Referring to the drawings, a feed connection portion 150 and a ground connection portion 160 are formed to be adjacent to either one of both ends of the cover 140 in a length direction. As illustrated in the drawings, the either one end may be an upper end on the basis of the drawing. Also, the feed connection portion 150 and the ground connection portion 160 may be disposed to be adjacent to both edges of the cover perpendicular to the one end. According to the drawing, the feed connection portion 150 and the ground connection portion 160 may be separated with the same distance from the one end. Through this, the cover 140, the feed connection portion 150 and the ground connection portion 160 may form a loop antenna.

A separation distance between the feed connection portion 150 and the ground connection portion 160 may be a half-wave length with respect to the frequency of the radio electromagnetic waves. More specifically, a path (L) connected from the feed connection portion 150 to the ground connection portion 160 by passing through either one end in the length direction is formed with a half-wave length with respect to the frequency of the radio electromagnetic waves. In other words, the first and the second contact regions 152, 162 are separated from each other with a half-wave length of the radio electromagnetic waves desired to transmit and receive. Alternatively, the sum of a separated distance between the first and the second contact regions 152, 162 and a length of the ground terminals 151, 161 may be a half-wave length. Through this, the cover 140, the feed connection portion 150 and the ground connection portion 160 may form a loop antenna. For example, the feed connection portion 150 may be a plus electrode, and the ground connection portion 160 may be a minus electrode, and a cover located between both connection portions 150, 160 may be a radiator of the loop antenna.

Referring to the drawings, an inductor 171 is electrically connected to the feed connection portion 150 at a position located adjacent to the feed connection portion 150.

The inductor 171 is mounted on the circuit board 118, and a signal transceiver 172 for transmitting and receiving a signal corresponding to the radio electromagnetic waves is disposed at the circuit board 118. The signal transceiver 172 may be a circuit for transmitting and receiving a RF signal.

Referring to the drawing, the feed connection portion 150, the inductor 171 and the signal transceiver 172 are connected in series with one another. The length of an antenna may be minutely adjusted by the inductor 171, and therefore, tuning for more effectively transmitting and receiving a designed frequency bandwidth may be accomplished.

Referring to FIG. 4, a surface exposed to the outside of the cover 140 may be formed to make a same plane as a surface of the rear case 122 to cover an end of the cover 140. Through this, the cover 140 and the rear case 122 form a streamlined rear surface of the second body 120. In addition, it may protect the user from the current being flowed in a state of concentrating on an end of the cover 140.

Figure 6:
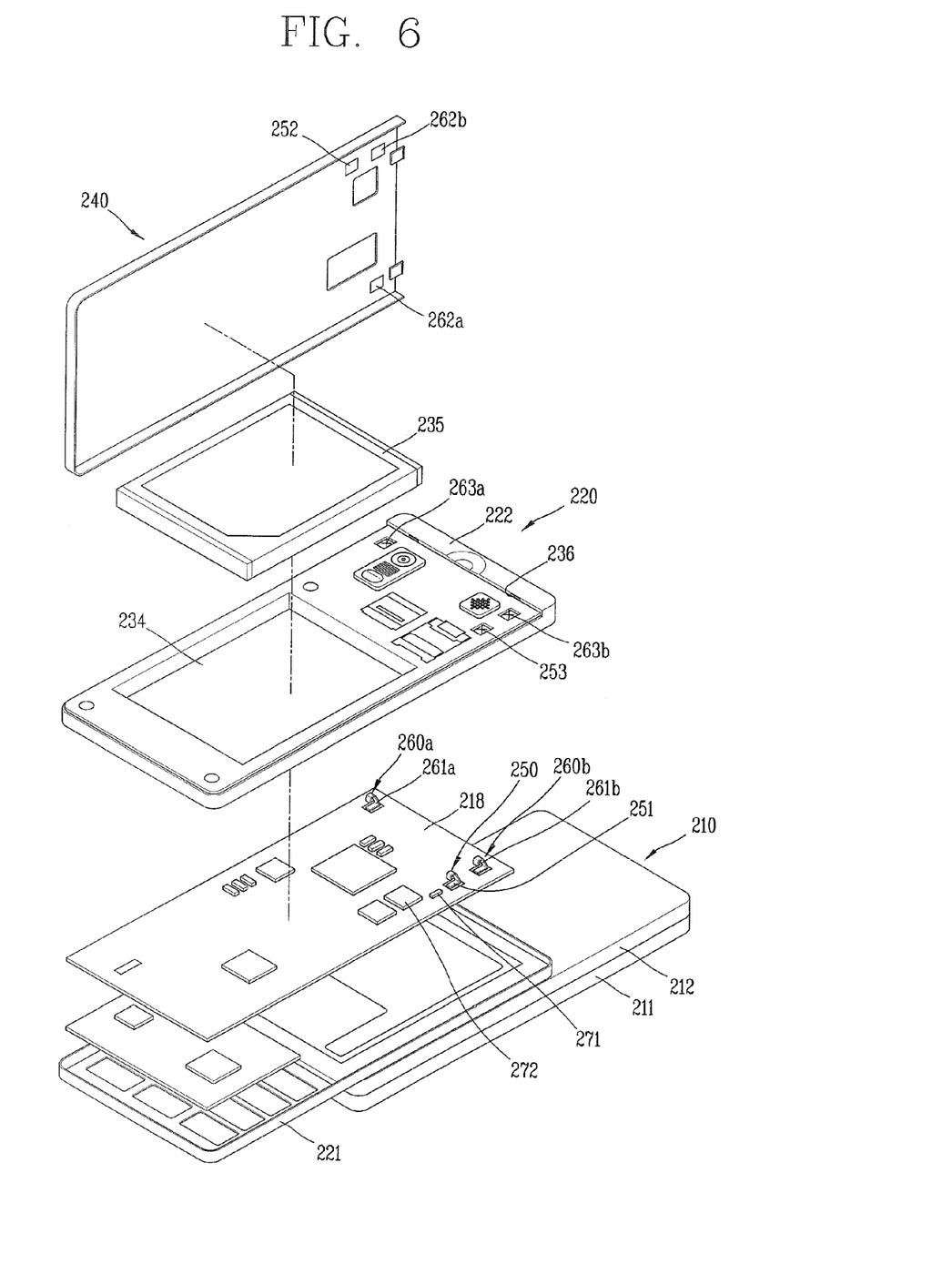
FIG. 6 is an exploded view illustrating a modified example of a ground connection portion and a feed connection portion in FIG. 3.
Figure 7:
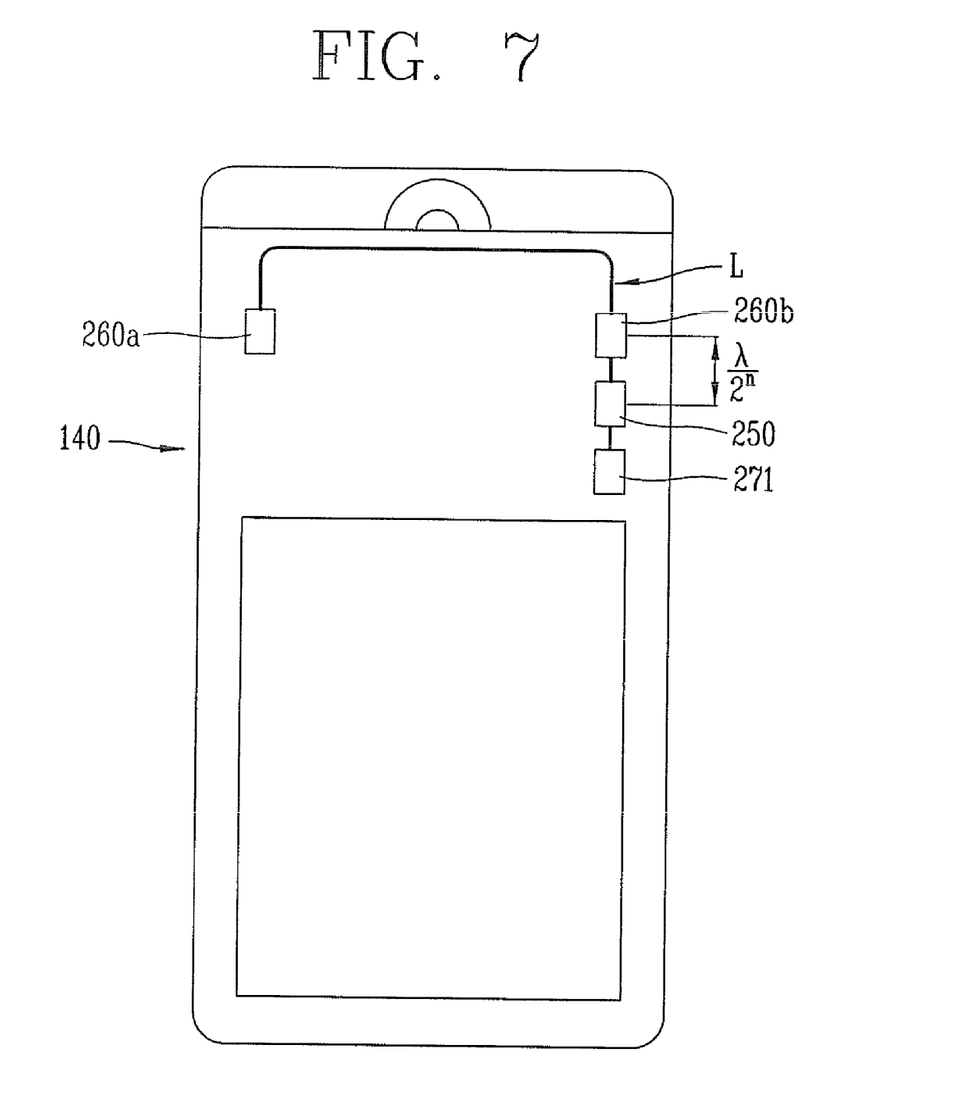
FIG. 7 is a conceptual view illustrating the concept of an antenna formed by a mobile terminal of FIG. 6.

Hereinafter, a loop antenna and a planar inverted-F (PIFA) antenna, or a loop antenna and a patch antenna, which are formed by a cover 240, a feed connection portion 250, and a ground connection portion 260, will be described with reference to FIG. 6. FIG. 6 is an exploded view illustrating a modified example of a ground connection portion and a feed connection portion in FIG. 3, and FIG. 7 is a conceptual view illustrating the concept of an antenna formed by a mobile terminal of FIG. 6.

The feed connection portion 250 and the ground connection portion 260 are formed to be adjacent to either one of both ends of the cover 240 in a length direction. Through this, the cover 240 may become a radiator of the PIFA antenna in which it is extended in one direction to make an inversed-F together with the feed connection portion 250 and ground connection portion 260.

The current supplied from a circuit board 218 is transferred to the cover 240, and the current circulated on the cover 240 is then entered to the circuit board 218 through the ground connection portion 260, thereby forming a transmission line for transmitting and receiving radio electromagnetic waves in the to air.

Referring to the drawing, the ground connection portion 260 may be formed in a plural number at positions separated from each other. A first and a second ground connection portion 260a, 260b are disposed to be adjacent to either one of both ends of the cover in a length direction, respectively.

In addition, the first ground connection portion 260a and the second ground connection portion 260b may be disposed to be adjacent to both edges of the cover, respectively, and the feed connection portion 250 may be disposed to be adjacent to the second ground connection portion 260b. More specifically, the feed connection portion 250 is formed to be separated from the second ground connection portion 260b in a direction crossed with a direction heading from the first ground connection portion 260a toward the second ground connection portion 260b.

The feed connection portion 250, and the first and the second ground connection portions 260a, 260b may be formed at a suitable position by the user's design. For example, if the contact point of the cover 240 is branched off with $\lambda/2''$, then it may be possible to implement an antenna in which a PIFA antenna is added to a loop antenna. Through this, the gain of the antenna is increased.

More specifically, the length of a path (L), which is passed through the first ground connection portion 260a and an end portion of the cover and connected to the feed connection portion 250, may be $\lambda/2$, and the distance between the second ground connection portion 260b and the feed connection portion 250 may be $\lambda/2''$. Also, the structure may be expressed as a loop antenna added by the principle of a patch antenna.

In the modified example, a detailed structure of the feed connection portion 250, and the first and the second ground connection portions 260a, 260b may be similar to the feed connection portion 150 and the ground connection portion 160 as described with reference to FIGS. 3 and 4. For example, an inductor 271 is electrically connected to the feed connection portion 250 at a position adjacent to the feed connection portion 250.

Figure 8:
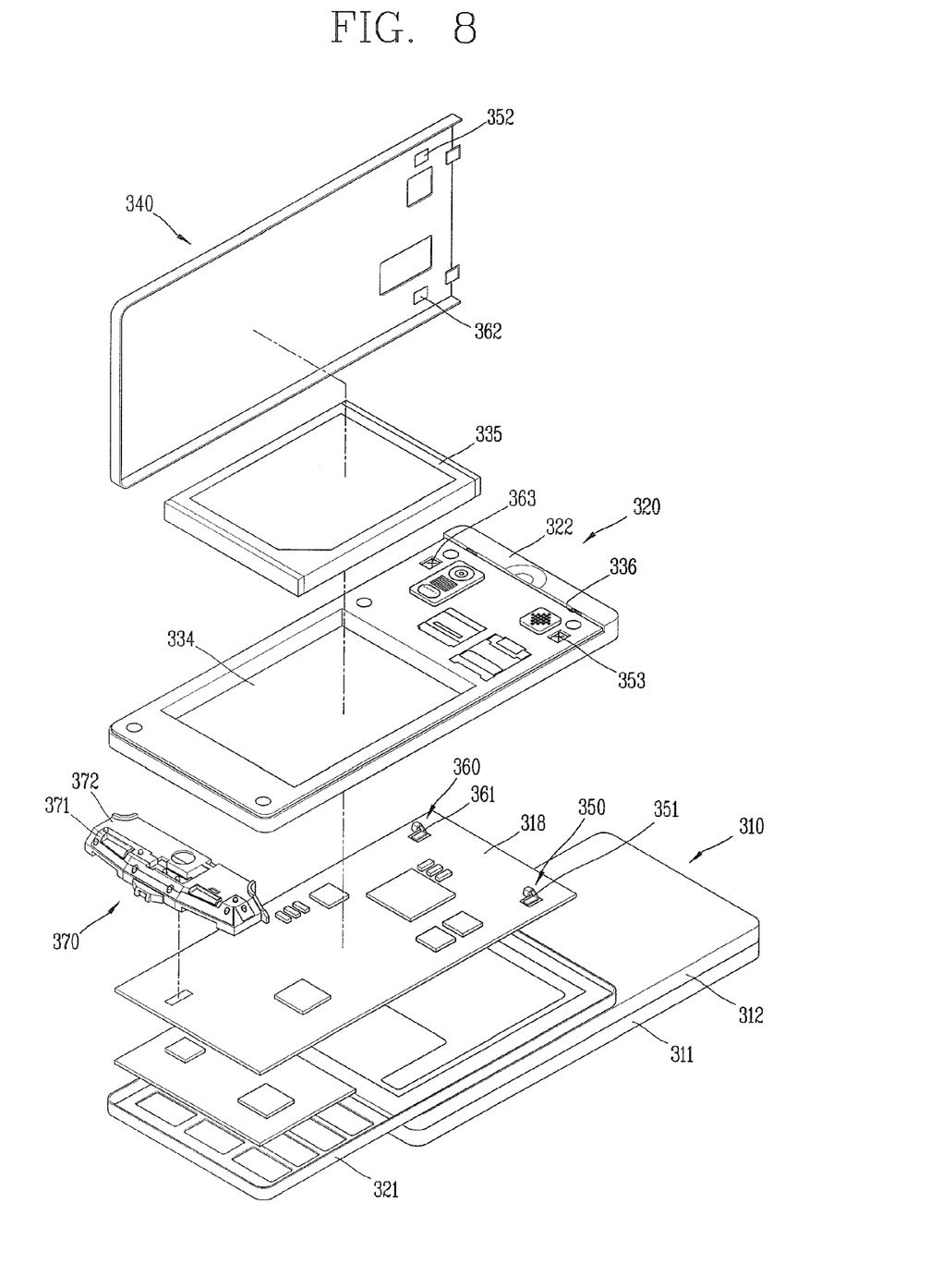
FIG. 8 is an exploded view illustrating another embodiment of a portable terminal associated with the present invention.

FIG. 8 is an exploded view illustrating another embodiment of a portable terminal associated with the present invention.

A portable terminal may include an antenna 370 built in a first or a second body 310, 320. The antenna 370 is formed to transmit and receive radio electromagnetic waves having a different frequency bandwidth from radio electromagnetic waves transmitted and/or received to and/or from a loop antenna that is made by a cover 340, a feed connection portion 350, and a ground connection portion 360.

Referring to the drawing, the antenna 370 is mounted to be adjacent to an end of the second body 320. The antenna 370 may include a radiator 371 and a carrier 372.

The radiator 371 is formed with a pattern capable of transmitting and receiving radio electromagnetic waves, and disposed to be adjacent to a rear case 322. Accordingly, radio electromagnetic waves is transmitted and received by mainly passing through the rear case 322. The radiator 371 may be formed with a conductive material, for example, gold, copper, and the like.

The carrier 372 is formed such that the radiator 371 is mounted therein. A through-hole through which the radiator 371 is passed is formed on the carrier 372. An end of the radiator 371 is passed through the through-hole, and electrically connected to a circuit board 318.

A mobile terminal transmits and receives radio electromagnetic waves having multiple frequency bandwidths using the loop antenna and built-in antenna 370. Through this, a low profile portable terminal may be implemented in which additional components are not required for the transmission and reception of multiple frequency bandwidths.

Assuming that there exist a first and a second frequency bandwidth, for example, for the multiple frequency bandwidths, either one of the first and the second frequency bandwidths may be a frequency bandwidth higher than the other one.

For example, the first frequency bandwidth may be a frequency bandwidth associated with Bluetooth, global positioning system (GPS), Wi-Fi, and the like, and transmitted and received by the PIFA antenna. The second frequency bandwidth may be a frequency bandwidth for a phone call of the portable terminal. The second frequency bandwidth may be a frequency above 1600 MHz, for example, 1600-2200 MHz.

Figure 9:
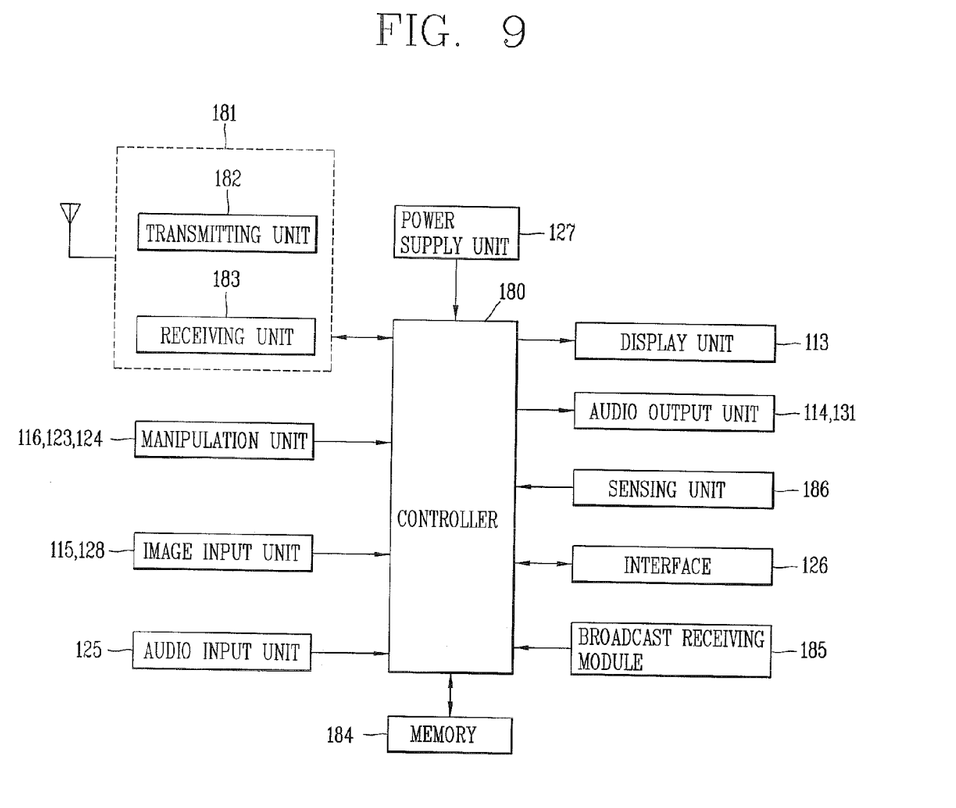
FIG. 9 is a block diagram illustrating a mobile terminal associated with the present invention.

FIG. 9 is a block diagram illustrating a mobile terminal associated with the present invention.

Referring to FIG. 9, a mobile terminal according to an embodiment of the present invention may include a wireless communication module 181, manipulation units 116, 123 and 124, video input units 115 and 128, an audio input unit 125, a display 113, audio output units 114 and 131, a sensing unit 186, an interface 126, a broadcast receiving module 185, a memory 184, a power supply 127, and a controller 180.

The controller 180 may control an overall operation of the mobile terminal. For example, the controller 180 may perform related control and processing for a voice call communication, data communication, telephony communication and the like.

Also, the controller 180 may control the operation of a mobile terminal according to the present invention in addition to a typical function control.

The wireless communication module 181 may transmit and/or receive radio signals to and/or from a mobile communication base station via an antenna. For example, the wireless communication module 181 manages the transmission and reception of audio data, text data, video data and control data under the control of the controller 180. To this end, the wireless communication module 181 may include a transmitting unit 182 for modulating and transmitting a signal to be sent, and a receiving unit 183 for demodulating a signal received.

The manipulation units 116, 123, 124 may be configured, as shown in FIG. 1, thus to provide the controller 180 with key input data input by a user to control the operations of the mobile terminal. The manipulation units 116, 123, 124 may include a dome switch, a touchpad (e.g., static pressure/capacitance), a jog wheel, a jog switch and the like.

The video input units 115 and 128 process image frames of still images or video obtained by an image sensor in a video call mode or a capturing mode. Such processed image frames are converted into image data displayable on the display 113 to be then output on the display 113.

The image frames processed by the video input units 115 and 128 may be stored in the memory 184 under the control of the controller 180 or be sent to the exterior via the wireless communication module 181.

The audio input unit 125 receives an external audio signal via a microphone while the mobile terminal is in a particular mode, such as phone call mode, recording mode and voice recognition. This audio signal is processed and converted into digital data. Such processed digital data is converted into a data format transmittable to a mobile communication base station via the wireless communication module 181 when the mobile terminal is in the phone call mode, and then outputted to the wireless communication module 181. The processed digital data may be stored in the memory 184 in a recording mode.

The audio input unit 125 may include various noise removing algorithms to remove noise generated in the course of receiving the external audio signal.

The display 113 displays information processed in the mobile terminal. For example, when the mobile terminal is in a phone call mode, the display 113 displays User Interface (UI) or Graphic User Interface (GUI) related to the call under the control of the controller 180. If the display 113 includes a touch screen, then it may be used as an input device as well as an output device.

The audio output units 114 and 131 may convert audio data received from the wireless communication module 181 or audio data stored in the memory 184 under the control of the controller 180 when the mobile terminal is in a call-receiving mode, a phone call mode, a recording mode, a voice recognition mode, or a broadcast receiving mode. Such converted audio data is then outputted to the exterior.

The audio output units 114 and 131 also output an audio signal associated with a function (e.g., outputting a call receiving sound, a message receiving sound, or the like) performed in the mobile terminal. Such audio output units 114 and 131 may include a speaker, a receiver, a buzzer and the like.

The sensing unit 186 may detect the current status of a mobile terminal, such as an open or closed configuration of the mobile terminal, a position of the mobile terminal, a presence or absence of the user contact with the mobile terminal and the like, thereby generating a sensing signal for controlling the operation of the mobile terminal. For example, the sensing unit 186 senses the open or closed configuration of a slide type mobile terminal, and outputs the sensed result to the controller 180, thereby allowing the operation of the mobile terminal to be controlled. Other examples include the sensing unit 186 sensing the presence or absence of power provided by the power supply 127, the presence or absence of a coupling or other connection between the interface 126 and an external device.

The interface 126 is often implemented to couple the mobile terminal with external devices. Typical external devices include wired/wireless headphones, external chargers, wired/wireless data ports, card sockets (e.g., memory card, SIM/UIM card or the like) and the like. The interface 126 may allow the mobile terminal to receive data or power from external devices and transfer such data or power to each component inside the mobile terminal, or transmit internal data of the mobile terminal to external devices.

The memory 184 may store a program for the control and processing of the controller 180, or temporarily store input/output data (e.g., phone book data, messages, still images, video, or the like).

Also, the memory 184 may store a program for controlling the operation of the mobile terminal according to the present invention.

The memory 184 may include typically known hard disk, a card-type memory (e.g., SD or XD memory), a flash memory, RAM, ROM and the like.

The broadcast receiving module 185 may receive a broadcast signal transmitted via satellites or terrestrial waves and convert such broadcast signal into a broadcast data format capable of being output to the audio output units 114 and 131 and the display 113 so as to output the converted signal to the controller 180. The broadcast receiving module 185 may also receive additional data associated with broadcasting (e.g., Electric Program Guide (EPG), channel list, or the like). The broadcast data converted in the broadcast receiving module 185 and the additional data may be stored in the memory 184.

The power supply 127 (i.e., battery) provides power required by the various components for the mobile terminal. The provided power may be internal power, external power, or combinations thereof.

According to the present invention having the foregoing configuration, it may be possible to form an antenna using a cover having a conductive material without implementing additional patterns. Through this, furthermore, a slimmer antenna and mobile terminal can be implemented.

According to the present invention, it may be possible to form an antenna having multiple frequency bandwidths by forming antennas on both the inside and outside of the main body, respectively.

The portable electronic device that has been described above is not limited to the configurations and methods of the foregoing embodiments, but all or part of each embodiment may be selectively combined with each other so as to implement various modifications of the embodiments.

What is claimed is:

1. A mobile terminal, comprising:
   a terminal main body formed with an accommodation chamber for accommodating a battery;
   a cover combined with the main body to cover the accommodation chamber and formed with a conductive material to transmit and receive radio electromagnetic waves;
   a circuit board formed with an electrical ground to process a signal corresponding to the radio electromagnetic waves;
   a feed connection portion electrically connecting the circuit board with the cover to allow the circuit board to feed power to the cover; and
   a ground connection portion electrically connecting the cover with the electrical ground to make a ground to the cover,
   wherein the ground connection portion comprises a first and a second ground connection portion disposed at positions separated from each other,
   wherein the first and second ground connection portions are disposed adjacent to opposing sides of the cover, respectively,
   wherein the feed connection portion is disposed adjacent to one of the first and second ground connection portions,
   wherein the feed connection portion, the cover, the first ground connection portion and the electrical ground are sequentially connected such that a part of the cover located between the feed connection portion and the first ground connection portion becomes a radiator of a loop antenna, and
   wherein the feed connection portion is disposed to be adjacent to the second ground connection portion such that the current supplied from the circuit board is transferred to the cover and the current circulated on the cover then enters the circuit board through the second ground connection portion.

2. The mobile terminal of claim 1, wherein the feed connection portion comprises:
   a feed terminal mounted on the circuit board and formed to elastically press the cover; and
   a first contact region formed on a surface of the cover to make contact with the feed terminal.

3. The mobile terminal of claim 2, wherein a surface of the cover is covered by a coating layer for protecting the cover, and the first contact region is connected with the outside by penetrating the coating layer.

4. The mobile terminal of claim 1, wherein the ground connection portion comprises:
   a ground terminal mounted on the circuit board, and electrically connected to the electrical ground, and formed to elastically press the cover; and
   a second contact region formed on a surface of the cover to make contact with the ground terminal.

5. The mobile terminal of claim 4, wherein a surface of the cover is covered by a coating layer for protecting the cover, and the second contact region is connected with the outside by penetrating the coating layer.

6. The mobile terminal of claim 1, further comprising:
   an inductor electrically connected to the feed connection portion at a position adjacent to the feed connection portion.

7. The mobile terminal of claim 6, wherein the inductor is mounted on the circuit board, and a signal transceiver for transmitting and receiving a signal corresponding to the radio electromagnetic waves is disposed on the circuit board, and the feed connection portion, inductor and signal transceiver are connected in series with one another.

8. The mobile terminal of claim 1, wherein the feed connection portion and the ground connection portion are formed to be adjacent to either one of both ends of the cover in a length direction.

9. The mobile terminal of claim 8, wherein a path connected from the feed connection portion to the ground connection portion by passing through the one end thereof is formed with a half-wave length with respect to the frequency of the radio electromagnetic waves.

10. The mobile terminal of claim 8, wherein the feed connection portion and the ground connection portion are separated with the same distance from the one end, respectively.

11. The mobile terminal of claim 1, wherein a surface exposed to the outside of the cover forms a same plane as a surface of the main body to cover an end of the cover.

12. The mobile terminal of claim 1, wherein the first and the second ground connection portions are disposed to be adjacent to an end of the cover in a length direction.

13. The mobile terminal of claim 12, wherein the feed connection portion is formed to be separated from the second ground connection portion in a direction perpendicular to a direction extending from the first ground connection portion toward the second ground connection portion.

14. The mobile terminal of claim 1, further comprising:
   an inductor electrically connected to the feed connection portion at a position adjacent to the feed connection portion.

15. The mobile terminal of claim 1, further comprising:
   an antenna built in the main body to transmit and receive radio electromagnetic waves having a frequency bandwidth different from the radio electromagnetic waves.

* * * * *